US012550124B2

(12) United States Patent
Goldstein et al.

(10) Patent No.: US 12,550,124 B2
(45) Date of Patent: Feb. 10, 2026

(54) SELECTIVE RESOURCE BLOCK TRANSMISSION IN A DISTRIBUTED ANTENNA SYSTEM

(71) Applicant: Dell Products L.P., Round Rock, TX (US)

(72) Inventors: Eran Goldstein, Montreal (CA); Ilya Portnik, Ashton (CA); Jayaram Venguduswamy Srinivasan, Nepean (CA)

(73) Assignee: DELL PRODUCTS L.P., Round Rock, TX (US)

( * ) Notice: Subject to any disclaimer, the term of this patent is extended or adjusted under 35 U.S.C. 154(b) by 349 days.

(21) Appl. No.: 18/340,202

(22) Filed: Jun. 23, 2023

(65) Prior Publication Data

US 2024/0430863 A1    Dec. 26, 2024

(51) Int. Cl.
*H04W 72/04*    (2023.01)
*H04W 72/51*    (2023.01)

(52) U.S. Cl.
CPC ........... *H04W 72/04* (2013.01); *H04W 72/51* (2023.01)

(58) Field of Classification Search
CPC ... H04W 72/04; H04W 72/042; H04W 72/51; H04W 72/044; H04W 88/085; H04W 24/02; H04W 16/26; H04W 92/12; H04B 7/155
See application file for complete search history.

(56) References Cited

U.S. PATENT DOCUMENTS

| 2017/0134892 | A1* | 5/2017 | Harel | H04W 52/146 |
| 2021/0314917 | A1* | 10/2021 | Lee | H04B 7/0404 |
| 2021/0345223 | A1* | 11/2021 | Imanilov | H04W 88/085 |

* cited by examiner

*Primary Examiner* — Mohamed A Kamara
(74) *Attorney, Agent, or Firm* — Amin, Turocy & Watson, LLP

(57) ABSTRACT

The technology described herein is directed towards selective resource block transmission in a distributed antenna system, which saves radio unit power and fronthaul bandwidth. A distributed unit tracks which radio units are serving which user equipment, and maintains and updates the associations. Before resource blocks are to be sent to the radio units for frequency domain transmission to the user equipment, subgroups of the resource blocks are selected based on the associations, so that only those resource blocks relevant to the user equipment being served by a radio unit are sent to that radio unit for transmission to its user equipment, while other resource blocks are excluded from being sent to that radio unit. The associations are updated as user equipment moves among different locations in the distributed antenna system that are covered by different radio units.

20 Claims, 13 Drawing Sheets

SELECTIVE RESOURCE BLOCK TRANSMISSION IN A DISTRIBUTED ANTENNA SYSTEM

BACKGROUND

A distributed antenna system (DAS) uses multiple antennas (as opposed to one antenna) coupled to a single source node to provide wireless coverage. In general, such a distributed antenna system distributes its radio units and corresponding antennas at different geographic locations, resulting in a larger coverage area. The spacing of the distributed antennas can be arranged to provide overlapping or non-overlapping coverage, e.g., based on a use case and a target system.

DAS can provide wireless communication coverage in a working area like an office or a private enterprise, by increasing the cell radius without deploying multiple cells, which is often beneficial because multiple cells require multiple higher layers and processing components. In one mode of DAS operation, a large area is covered by one cell, with coverage achieved by deploying multiple radio units that connect to one distributed unit (e.g., as defined in Open Radio Access Network, or O-RAN standards). This simplifies and reduces the computational load on the L1 physical layer and L2 hardware/server layer, although there is a limitation resulting from the one cell system as to the total number of simultaneous users or data. The amount of distribution among the coverage area can be varied over time, depending on the load of the system.

There are drawbacks to current DAS implementations. This includes, when transmitting resource blocks in the frequency domain, consumption of more power by radio units, and occupying more bandwidth in each link between the packet switching element and the radio units resulting from having to process more packets and/or packets of larger length.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards a distributed antenna system that transmits only relevant information (resource blocks) in the frequency domain based on the given user equipment (UE) currently being served by each particular radio unit (corresponding to a distributed antenna location). This is in contrast to existing distributed antenna system architectures, in which the resource block data for all UE devices are transmitted by all the radio units, irrespective of which UE device(s) are being served by which radio unit, resulting in the radio units receiving unnecessary signals and then transmitting the unnecessary signals over the air; (unnecessary signals that are basically unused/ignored out by each UE device when received so as to obtain only the relevant data for each UE device).

In general, the technology described herein selects and transmits only the resource blocks directed to the user equipment device or devices being served by each separate radio unit of the distributed antenna system. In one implementation, this can be done at the distributed unit by determining/tracking which radio units are serving which UE device(s), and for each separate radio unit, selecting the resource blocks that need to be transmitted while excluding those that do not need to be transmitted by that radio unit to the user equipment (resource blocks otherwise filtered out by) being served by that radio unit.

Reference throughout this specification to "one embodiment," "an embodiment," "one implementation," "an implementation," etc. means that a particular feature, structure, or characteristic described in connection with the embodiment/ implementation is included in at least one embodiment/ implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
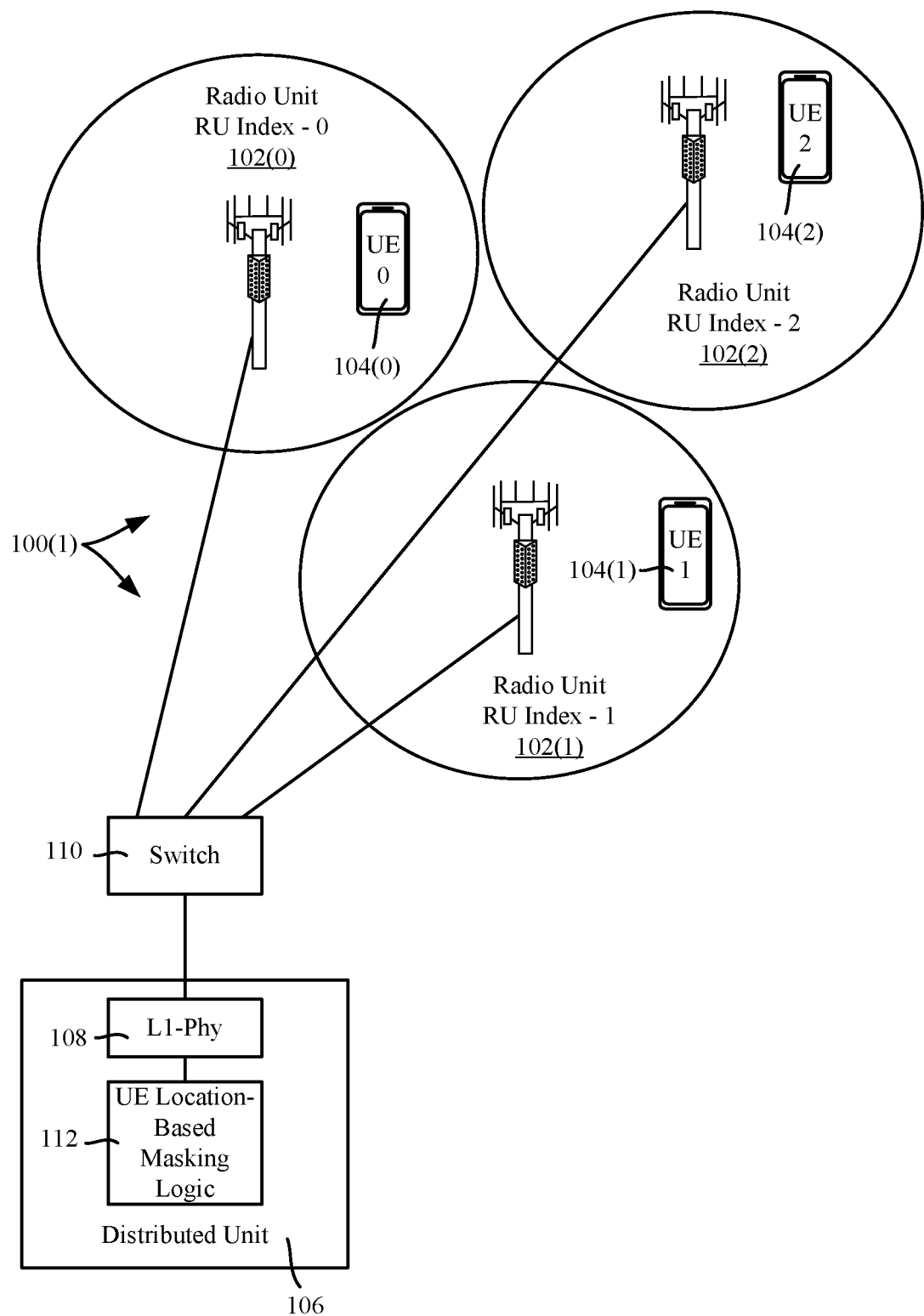
FIG. 1 depicts an example representation of a distributed antenna system in which user equipment (UE)-based masking logic selects which radio units receive which resource blocks, in accordance with various aspects and implementations of the subject disclosure.

FIG. 1 is an example representation of a system/architecture in an operating state 100(1), including three radio units 102(0)-102(2) that are part of a distributed antenna system, each corresponding to a separate coverage area. Note that while three radio units 102(0)-102(2) are shown in this example, it is understood that any practical number of radio units may be present in a distributed antenna system configuration, including those in which coverage areas may overlap to an extent.

As shown in the example state 100(1) of FIG. 1, the radio unit 102(1) is serving UE0 104(0), the radio unit 102(1) is serving UE1 104(1) and the radio unit 102(2) is serving UE2 104(2). For purposes of explanation, the radio units 102(0)-102(2) are shown as having corresponding RU indexes 0-3, respectively. The location of user equipment within the distributed antenna system generally determines which radio unit is serving that user equipment.

In general, a distributed unit 106 (e.g., defined in O-RAN standards) communicates data via its L1-physical layer 108 to the radio units 102(0)-102(2) via to a switching element (or simply switch) 110 that couples the distributed unit 106 to the radio units 102(0)-102(2). In one implementation, optical links are used between the L1-physical layer 108 and the switch 110, as well as from the switch 110 to the radio units 102(0)-102(2), (although other types of links may be used).

As described herein, UE location-based masking logic 112 operates such that only resource blocks needed by a radio unit for the user equipment the radio unit is serving are sent to that radio unit for transmission to a user equipment. More particularly, in an O-RAN system, the distributed unit 106 can transfer frequency domain data to the radio units 102(0)-102(2). Thus, as will be understood, in the example state 100(1) of FIG. 1, only the resource blocks for the UE0 104(0) are sent to the radio unit 102(0), only the resource blocks for the UE1 104(1) are sent to the radio unit 102(1), and only the resource blocks for the UE2 104(2) are sent to the radio unit 102(2).

Figure 2:
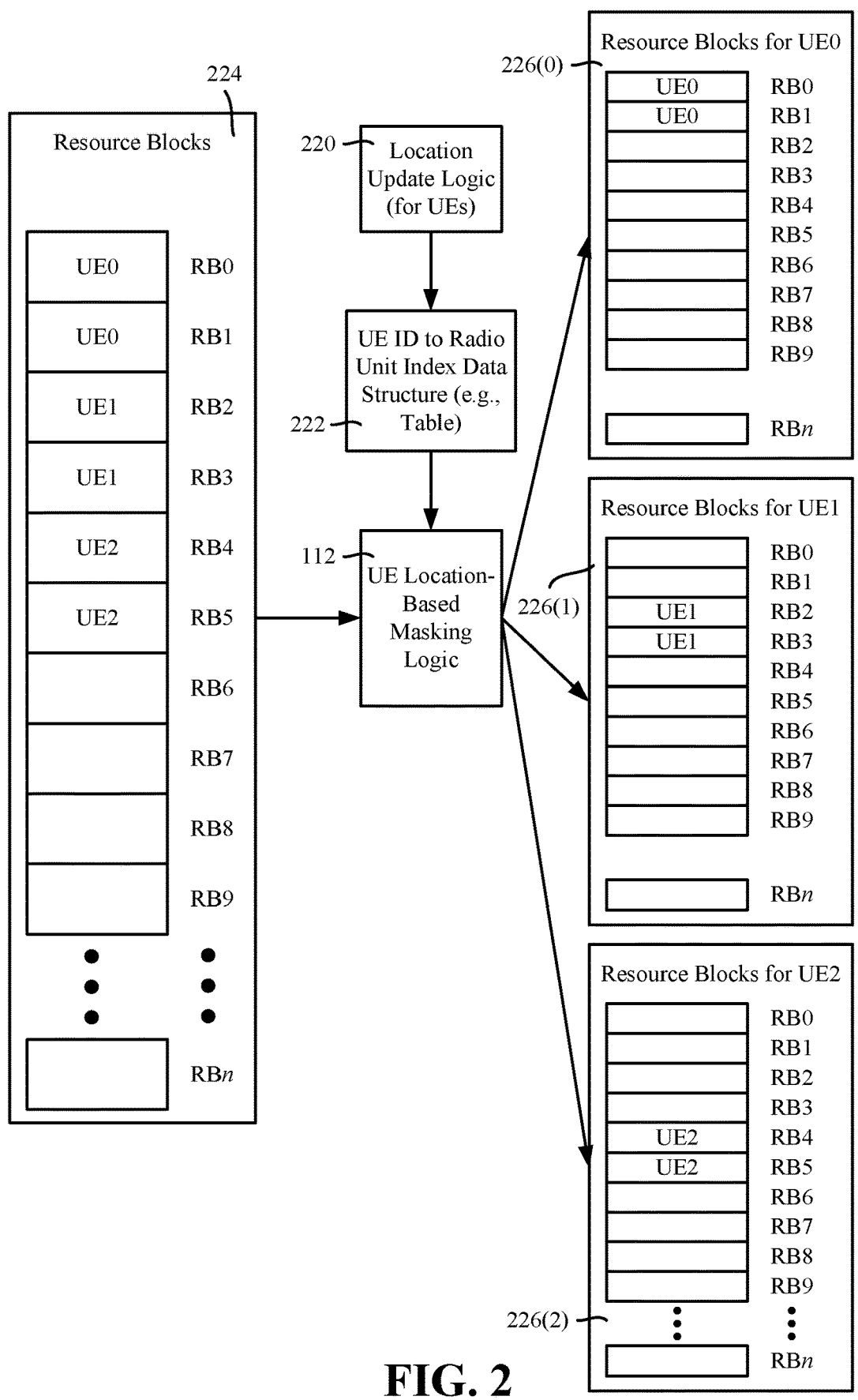
FIG. 2 shows example data structures of resource blocks before and after processing by UE-based masking logic corresponding to the example of FIG. 1, in accordance with various aspects and implementations of the subject disclosure.

Consider the example shown in FIG. 2, in which a larger, source group of resource blocks 224, namely RB0-RB5 in this example, are to be sent to the radio units 102(0)-102(2) for transmitting over-the-air to the UE devices 104(0)-104(2), as shown in the state 100(1) of FIG. 1. As seen in the group of resource blocks 224, the resource blocks RB0 and RB1 are to be transmitted to UE0 (labeled 104(0) in FIG. 1), the resource blocks RB2 and RB3 are to be transmitted to UE1 (labeled 104(1) in FIG. 1) and the resource blocks RB4 and RB5 are to be transmitted to UE2 (labeled 104(2) in FIG. 1). In existing distributed antenna systems, the entire group of resource blocks 224 are sent to each radio unit (the radio units 102(0)-102(2) in FIG. 1), and in turn transmitted to each of the UE devices 104(0)-104(2).

As described herein, instead of transmitting the larger group of the resource blocks 224 to each of the radio units radio units 102(0)-102(2) for over the air transmission to each UE device 104(0)-104(2), the distributed unit 106 (FIG. 1) selects only the relevant resource blocks needed by each radio unit for serving its UE device(s), and sends only those resource blocks for transmitting to its served UE device or devices. This can be accomplished by identifying the associated radio unit to which each UE is connected, and selecting and sending only the resource blocks for the UE to that radio unit.

In one implementation, selection can be done by masking (e.g., as described in the O-RAN standards) the resource blocks to include relevant ones and exclude those that need not be served by a radio unit, thereby excluding the unnecessary resource blocks from further use with respect to that radio unit. This saves bandwidth (via less packets/packet data) on each link from the switch 110 (FIG. 1) to each radio unit, and saves transmission power when transmitting from a radio unit to its served UE device or devices.

In general and as described below with reference to FIG. 5, location update logic 220 determines the initial location (at attach time) for each UE with respect to which radio unit is serving that UE, and updates the location data/radio unit association if and when the UE moves thereafter (run time). For example, the logic 220 identifies the radio index corresponding to each UE and maintains a data structure 222 (e.g., a table or other association), which can be inside the distributed unit memory. As described herein, this data structure 222 is used to select (mask) the relevant resource blocks and exclude others before transmitting the data to a radio unit.

In the example of FIG. 2, once determined that UE0 104(0) is served by radio unit 102(0), by masking, the UE location-based masking logic 112 can include only resource blocks RB0 and RB1 to the radio unit 102(0), as shown in the resource block data structure 226(0), while excluding the resource blocks RB2-RB5. Similarly, upon determining that UE1 104(1) is served by radio unit 102(1), the UE location-based masking logic 112 can include only resource blocks RB2 and RB3 to the radio unit 102(1), as shown in the resource block data structure 226(1), while excluding the resource blocks RB0, RB1, RB4 and RB5. And again, upon determining that UE2 104(2) is served by radio unit 102(2), the UE location-based masking logic 112 can include only resource blocks RB4 and RB5 for sending to the radio unit 102(2), as shown in the resource block data structure 226(1), while excluding the resource blocks RB0-RB3.

In sum, because the UE0 104(0) is currently being served by the radio unit 102(0), the distributed unit 106 only sends the resources block(s) that are related to UE0 104(0) (namely resource blocks RB0 and RB1) to the radio unit 102(0). Similarly, the distributed unit 106 only sends the resources block(s) that are related to UE1 104(1) (namely resource blocks RB2 and RB3) to the radio unit 102(1) and only sends the resources block(s) that are related to UE2 104(2) (namely resource blocks RB4 and RB5) to the radio unit 102(2). In this way, the number of fronthaul bytes transmitted is reduced, and the number of resource blocks processed by a radio unit is reduced, which reduces the power consumption on the radio unit.

Figure 3:
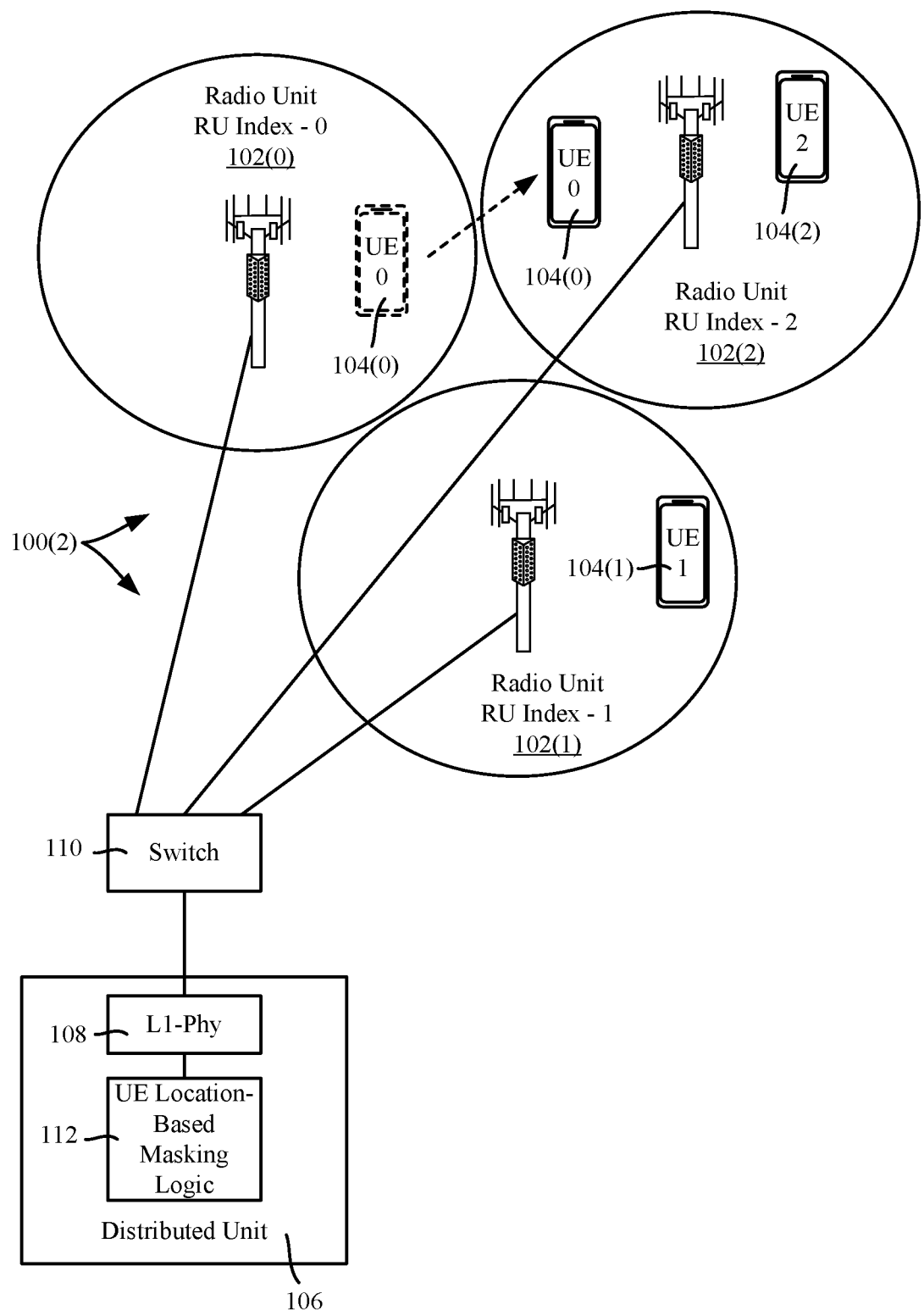
FIG. 3 depicts an example representation of a distributed antenna system in which UE-based masking logic selects which radio units receive which resource blocks, including when two UEs are associated with the same radio unit, in accordance with various aspects and implementations of the subject disclosure.

Turning to an explanation of mobility, FIG. 3 is an example representation of a system/architecture in an operating state 100(2), similarly including the three radio units 102(0)-102(2) that are part of a distributed antenna system, each corresponding to a separate coverage area. As shown in the example state 100(2), the UE0 104(0) has moved from being served by the radio unit 102(0) to now being served by the radio unit 102(2), which is also serving the UE0 104(2).

Figure 4:
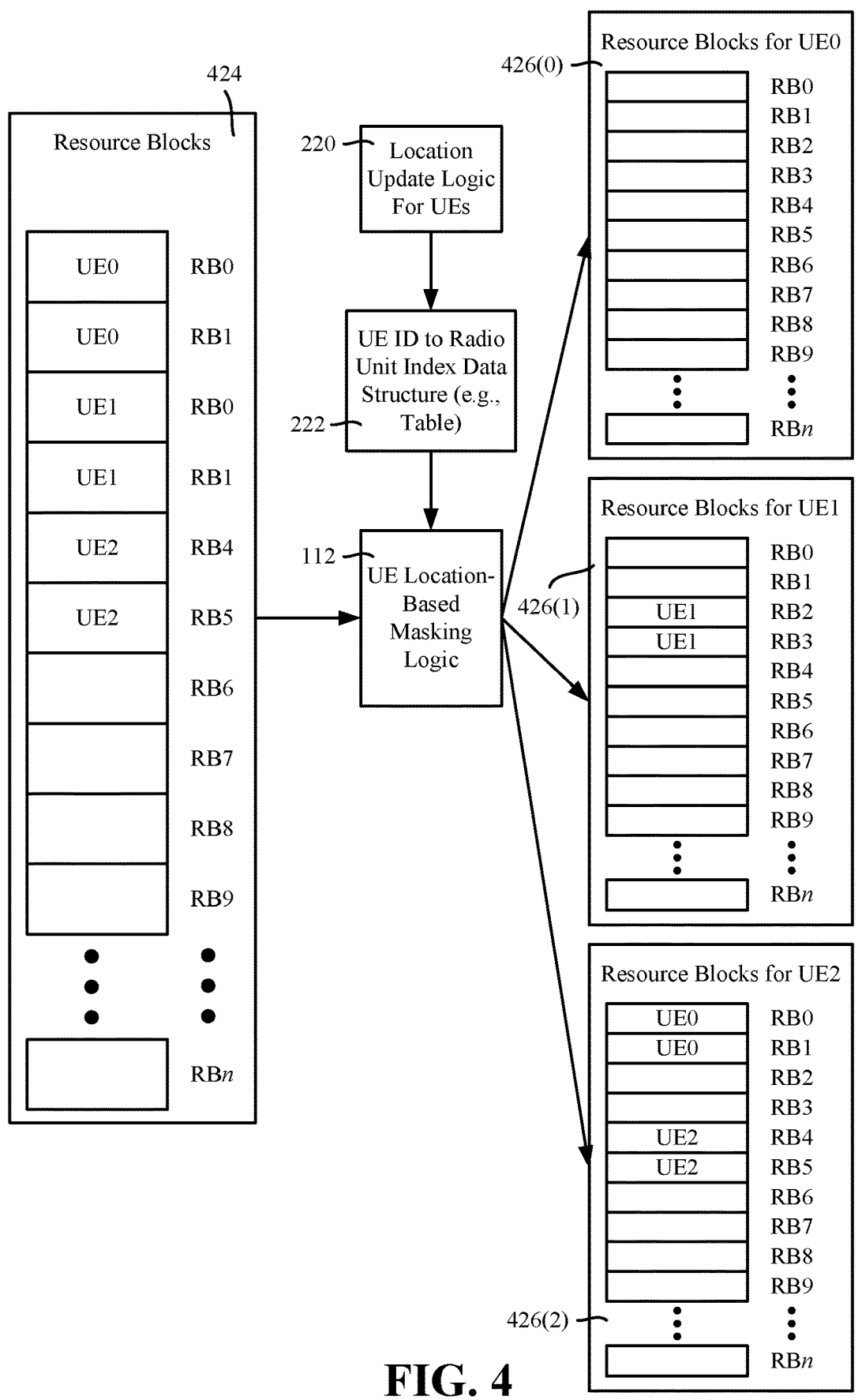
FIG. 4 shows example data structures of resource blocks before and after processing by UE-based masking logic corresponding to the example of FIG. 3, in accordance with various aspects and implementations of the subject disclosure.

As described with reference to the example shown in FIG. 4, once determined that the UE0 104(0) is also being served by the radio unit 102(2), given a subsequent source group 424 of resource blocks RB0-RB5, the UE location-based masking logic 112 can include the resource blocks RB0 and RB1, along with the resource blocks RB4 and RB5 (for UE 102(2)) for sending to the radio unit 102(2), as shown in the resource block data structure 426(2). The resource blocks for the UE 104(1), namely the resource blocks RB2 and RB3, are excluded, and instead are sent to the radio unit 102(1) for transmitting to the radio unit UE1 104(1), as shown in the resource block data structure 426(1). No resource blocks are sent to the radio unit 102(0) in this example.

Again, via the masked representation of frequency domain data in the resource blocks, only data relevant to each of the UEs 104(0)-104(2) are transmitted by their serving radio units. In this way number of bytes transmitted to radio is reduced, which reduces the fronthaul traffic; among the advantages, the processing power used by each radio unit is reduced because the resource blocks that each radio transmits over the air is reduced (including zero resource blocks by the radio unit 102(1) in the example of FIGS. 3 and 4). The overall channel power used is less when compared to other DAS systems.

Figure 5:
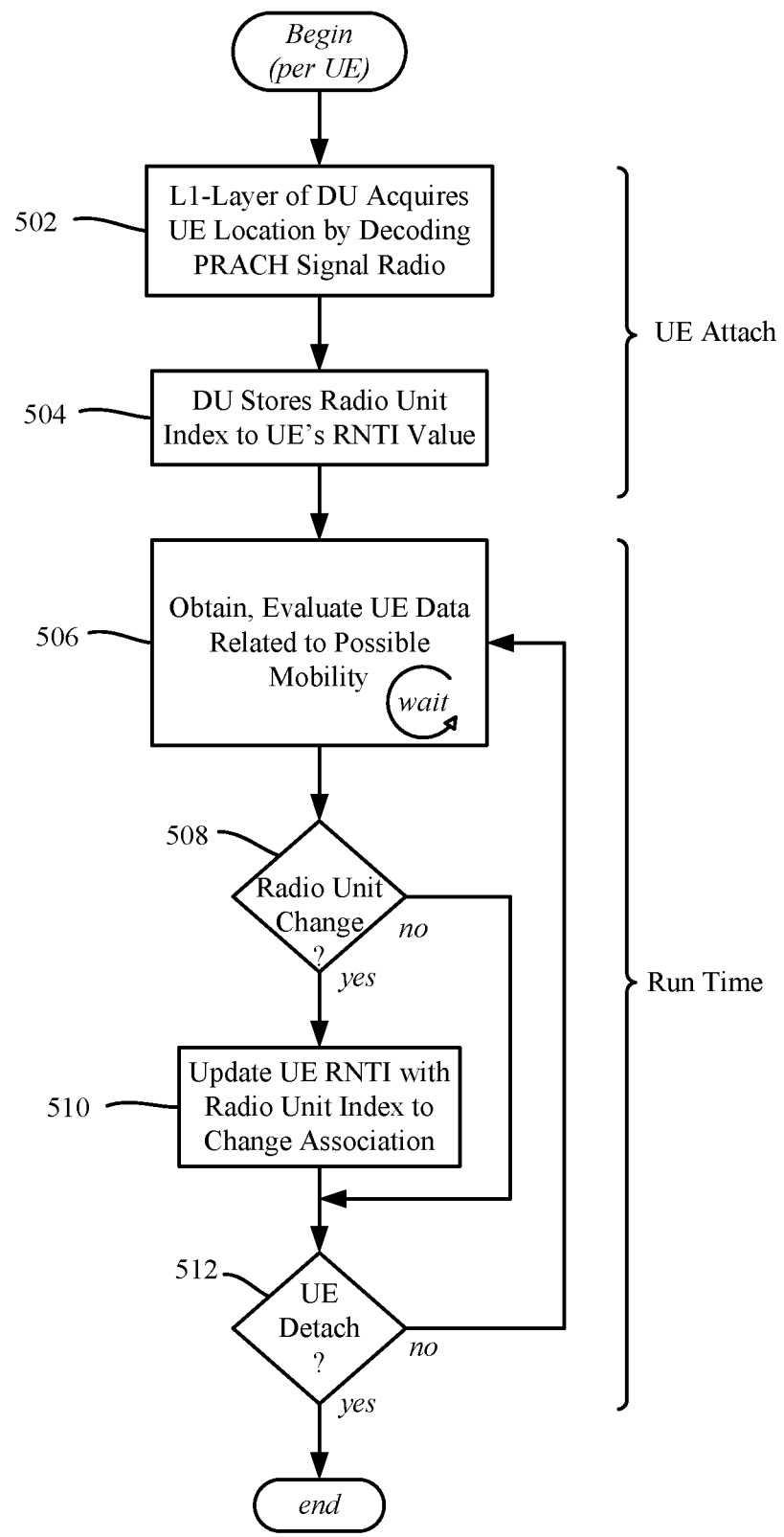
FIG. 5 is a flow diagram showing example operations related to tracking which UEs are associated with which radio units, in accordance with various aspects and implementations of the subject disclosure.

Turning to identifying and tracking which UE is being served by which radio unit, FIG. 5 shows example operations for a UE, beginning at operation 502 where at initial attach time, the L1 physical layer acquires the UE location by decoding the PRACH (physical random-access channel) signal from the radio units. A RACH decoding success indicates the UE's initial location, and thus once the RACH procedure is successful, the distributed unit 106 (FIG. 1) stores this radio unit index to the UE's radio network temporary identifier (RNTI) value, as represented by operation 504. The UE is thus associated with one radio unit.

Example operations 506-512 show updating of the UE-to-radio unit association during run time, e.g., at a reasonable update rate for a given environment (e.g., walking only versus automobile traffic). Operation 506 represents evaluating one or more various UE-related data to determine if the UE is being served by a different radio unit (operation 508), typically as a result of a location change (although other causes can be responsible); this can be done regularly for each UE at a reasonable update rate, e.g., as represented by the "wait" time in operation 506. If so, operation 510 updates the UE's RNTI with the changed radio unit index, to change the UE-to-radio unit association.

Note that operation 512 continues the run time operations until the radio unit detaches from the system. Note further that there can be parallel operations for updating the respective associations of respective other UEs.

During run time, there are multiple ways to update the UE's associated radio unit, e.g., the UE's location. The following describes some non-limiting ways to do so; one or a combination of the following ways can be used; note however that there can be other methods to identify the radio associated with UE RNTI.

One way is to evaluate the periodic physical random-access channel, in which each user equipment device sends physical random-access channel data. The L1 physical layer can decode the data and update the radio unit index, generally corresponding to the UE's geographic location.

Another way of tracking a user equipment's location data includes using the physical uplink control channel decoding result. When the physical uplink control channel decoding regularly (e.g., constantly) reports discontinuous transmission on the received data from a UE's radio unit where the UE was last connected, then other radio unit data can be decoded to check if the user equipment device has moved its location from one radio unit to another radio unit.

Yet another way of tracking a UE's location data can be based on the sounding reference signal report of the user equipment device. When the signal quality decoded from the UE device's initial radio data is bad, then the L1 physical layer can decode the sounding reference signal channel data for that EU, with the data collected from other radios to identify the signal power and the user equipment device's mobility. Alternatively, or in addition to other ways, tracking the UE location data/radio unit can be based on the channel-state information-reference signal report from the user equipment device on uplink channel information; when the channel quality reported is low, then the L2 layer can initiate an aperiodic measurement for the user equipment device with different radio indexes to identify the channel conditions from other radio indexes.

Tracking of the location data/radio unit can be based on the physical uplink shared channel cyclic redundancy check status. When the UE's signal-to-noise ratio is low, the scheduler has reduced the modulation and coding scheme to increase the redundancy and lowering the modulation scheme. When the cyclic redundancy check status constantly or regularly fails, L2 can initiate an aperiodic sounding reference signal to determine the channel conditions from other radio units to identify the user equipment device mobility.

As can be seen, FIG. 5 and the above techniques identify the UE current location/radio unit, to regularly update the association when the UE is in mobility. Note that although not explicitly represented in FIGS. 1-4, in the event of a UE being present in overlapping coverage areas, the above techniques can be used to select the "best" radio unit with respect to signal quality and/or the like.

Figure 6:
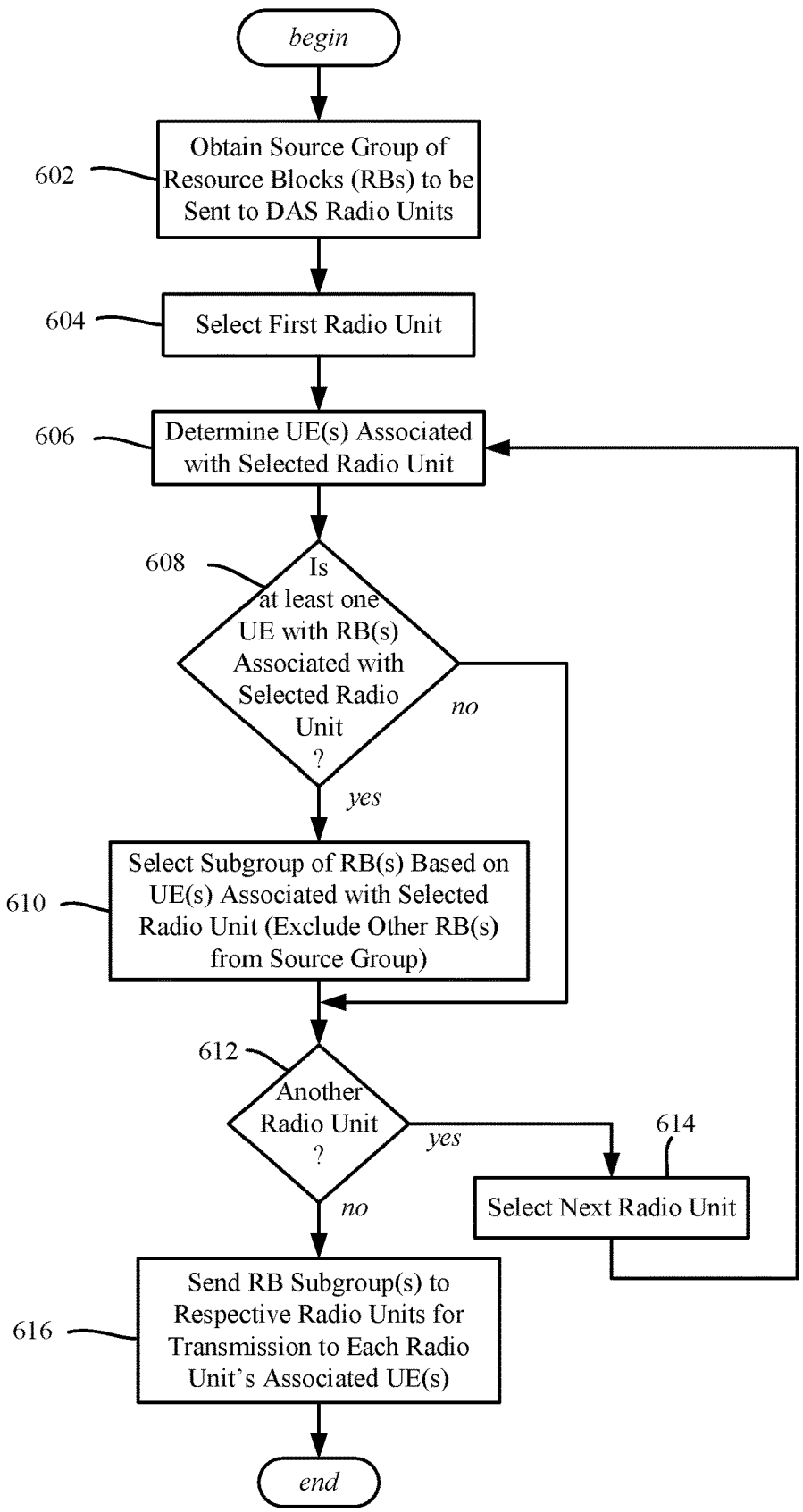
FIG. 6 is a flow diagram showing example operations related to selecting resource block(s) for UEs based on the UEs' respective associations with radio units, in accordance with various aspects and implementations of the subject disclosure.

FIG. 6 shows example operations for selecting appropriate subgroups of resource blocks from a source (larger group) for sending to each UE's serving radio unit, e.g., per transmission timeframe. Operation 602 represents obtaining a source group of resource blocks (RBs) to be sent to the radio units of the distributed antenna system (DAS). Note that operation 602 is currently being done in other DAS systems; however in contrast, as described herein, via the following operations of FIG. 6, the entire source group will not be sent to every radio unit for transmitting to UEs.

Operation 604 represents selecting a first radio unit, and operation 606 determines the UEs (if any) that are being served by that radio unit, e.g., via the association data structure 222 (FIGS. 2 and 4) as described herein. Operation 608 evaluates whether there is at least one UE with resource blocks in the source group; if not, operations 612 and 614 select the next radio unit, and so on, until none remain to evaluate.

If a radio unit has at least one UE to which a resource block needs to be sent, operation 610 selects subgroup of resource block(s) based on the UE or UEs associated with the selected radio unit. Operation 610 can be thought of as excluding other RB(s) that are in the larger source group from the subgroup to be sent to the selected radio unit.

Operations 612 and 614 select the next radio unit as the selected unit, and so on, until none remain to evaluate with respect to subgroup selection. Operation 616 represents sending respective resource block subgroup(s) to their respective radio units for transmission to each radio unit's associated UE(s).

FIG. 6 is only one example, and is generally repeated before each timeframe in which resource blocks are to be sent. Note that at least some of the operations of FIG. 6 can be performed in parallel.

It should be noted that while the technology described herein can be implemented in a distributed unit in a straightforward way, this is only one example implementation. Indeed, it is feasible for at least some of the logic to be implemented in one or more separate components, e.g., between the distributed unit and the switching element (or possibly even in an intelligent switching element). For example, a component that performs the tracking of UE to radio unit association, and the selection of subgroups of resource blocks based on the tracked associations, can be placed in the link between a legacy distributed unit and the switching element to perform the general operations described herein.

Figure 7:
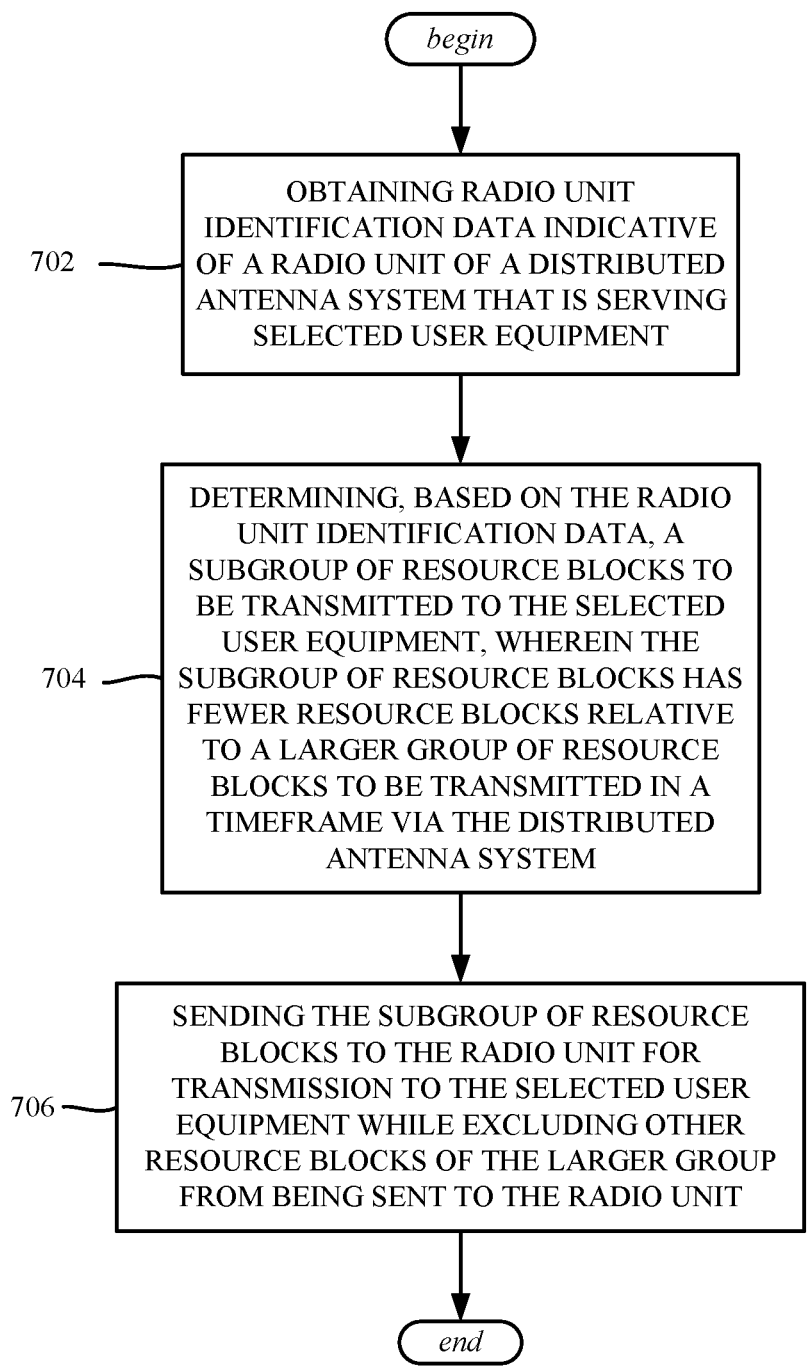
FIG. 7 is a flow diagram showing example operations related to sending a subgroup of resource blocks to a radio unit for transmission to selected user equipment while excluding other resource blocks from being sent to the radio unit, in accordance with various aspects and implementations of the subject disclosure.

One or more aspects can be embodied in a network device, such as represented in the example operations of FIG. 7, and for example can include a memory that stores computer executable components and/or operations, and a processor that executes computer executable components and/or operations stored in the memory. Example operations can include operation 702, which represents obtaining radio unit identification data indicative of a radio unit of a distributed antenna system that is serving selected user equipment. Example operation 706 represents determining, based on the radio unit identification data, a subgroup of resource blocks to be transmitted to the selected user equipment, wherein the subgroup of resource blocks has fewer resource blocks relative to a larger group of resource blocks to be transmitted in a timeframe via the distributed antenna system. Example operation 706 represents sending the subgroup of resource blocks to the radio unit for transmission to the selected user equipment while excluding other resource blocks of the larger group from being sent to the radio unit.

Determining the subgroup of resource blocks can include masking the other resource blocks of the larger group of resource blocks.

Further operations can include maintaining the radio unit identification data as part of a radio network temporary identifier value associated with the selected user equipment.

The selected user equipment can include at least two different user equipment.

Obtaining the radio unit identification data can include tracking location data of a user equipment of the selected user equipment, determining the radio unit identification data based on the location data, and wherein the operations further can include associating the user equipment with the radio unit identification data.

Tracking the location data can include decoding physical random-access channel signal data from the radio at initial attach time of the user equipment.

The radio unit can be a first radio unit, the radio unit identification data can be first radio unit identification data, the location data can be first location data, tracking the location data can include determining that the user equipment has moved to a different location having second location data, and further operations can include determining second radio unit identification data based on the second location data, and associating the user equipment with the second radio unit identification data for a subsequent transmission of resource blocks to the user equipment. Tracking of the location data can include at least one of: decoding periodic physical random-access channel data, evaluating physical uplink control channel decoding result data, evaluating sounding reference signal report data, evaluating channel-state information-reference signal report, evaluating physical uplink shared channel cyclic redundancy check status data, or initiating a sounding reference signal to determine channel condition data corresponding to the user equipment from at least one other radio unit other than the radio unit. The timeframe can be a first timeframe, the subgroup can be a first subgroup of a first larger group, and further operations can include determining, based on the second radio unit identification data, a second subgroup of resource blocks to be transmitted to the user equipment; the second subgroup can have fewer resource blocks relative to a second larger group of resource blocks to be transmitted in a second timeframe via the distributed antenna system, and sending the second subgroup of resource blocks to the second radio unit for transmission to the user equipment without sending other resource blocks of the larger group to the second radio unit. The timeframe can be a first timeframe, the subgroup can be a first subgroup of a first larger group, the user equipment can be a first user equipment, and further operations can include determining, based on the second radio unit identification data, a second subgroup of resource blocks to be transmitted to the first user equipment and transmitted to a second user equipment of the selected user equipment that is associated with the second radio unit identification data, wherein the second subgroup of resource blocks has fewer resource blocks relative to a second larger group of resource blocks to be transmitted in a second timeframe via the distributed antenna system, and sending the second subgroup of resource blocks second radio unit for transmission to the first user equipment and to the second user equipment without sending other resource blocks of the larger group to the second radio unit.

The network equipment can include a distributed unit coupled to the radio unit of the distributed antenna system and coupled to at least one other radio unit of the distributed antenna system other than the radio unit.

Figure 8:
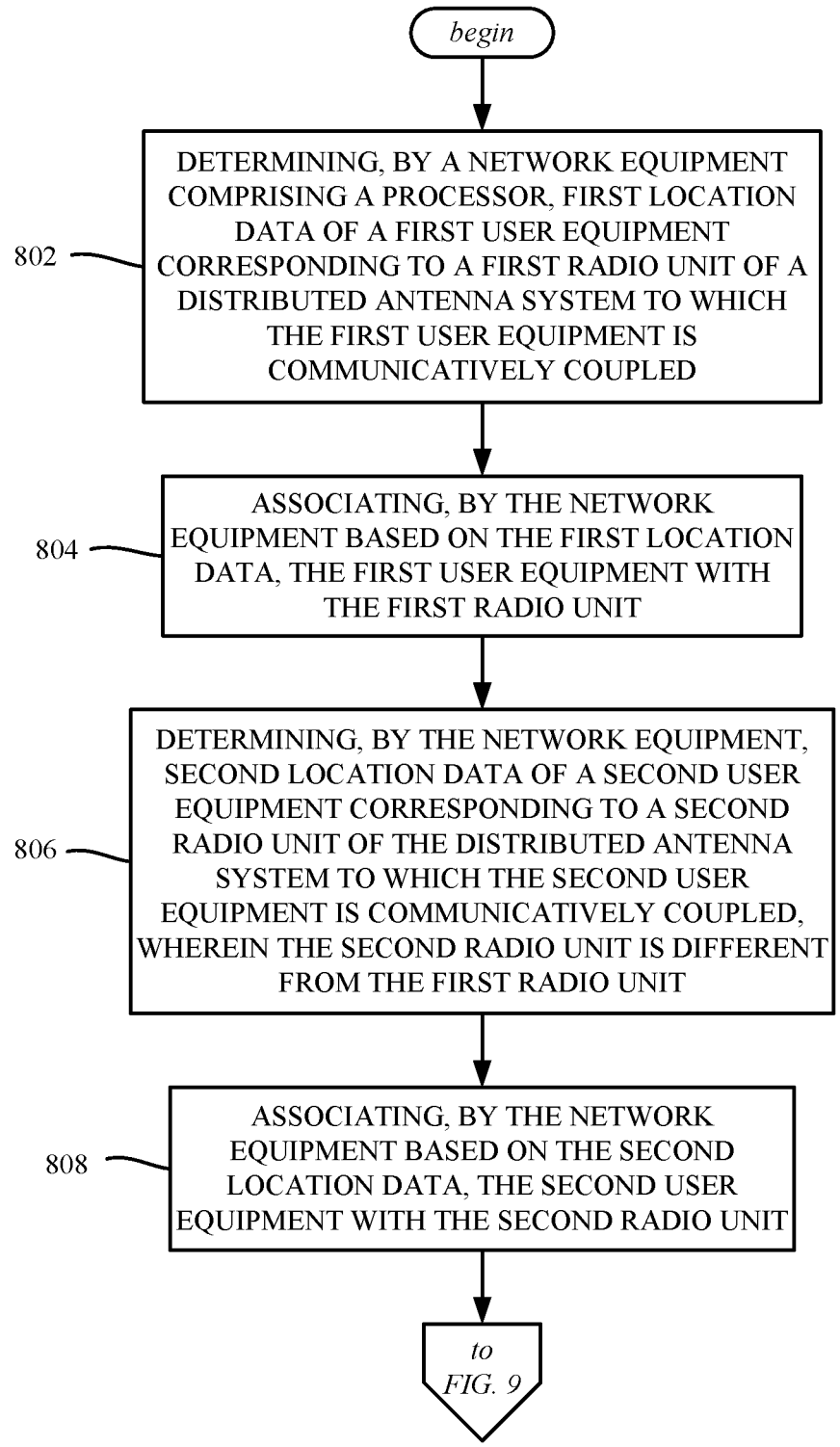
FIGS. 8 and 9 comprise is a flow diagram showing example operations related to sending subgroups of resource blocks to radio units to facilitate transmission to selected user equipment, in accordance with various aspects and implementations of the subject disclosure.
Figure 9:
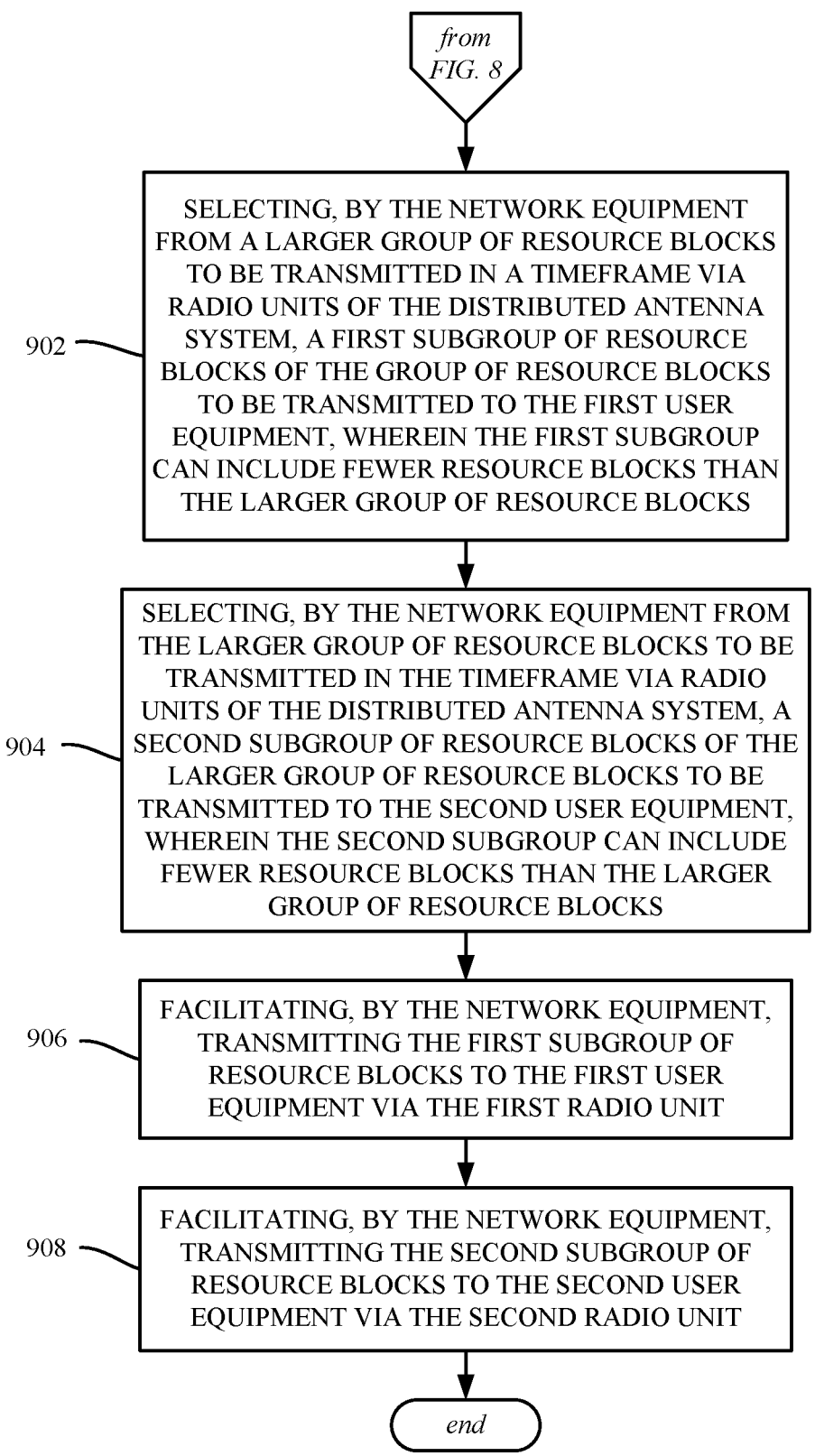

One or more example aspects, such as corresponding to example operations of a method, are represented in FIGS. 8 and 9. Example operation 802 of FIG. 8 represents determining, by a network equipment comprising a processor, first location data of a first user equipment corresponding to a first radio unit of a distributed antenna system to which the first user equipment is communicatively coupled. Example operation 804 represents associating, by the network equipment based on the first location data, the first user equipment with the first radio unit. Example operation 806 represents determining, by the network equipment, second location data of a second user equipment corresponding to a second radio unit of the distributed antenna system to which the second user equipment is communicatively coupled, wherein the second radio unit is different from the first radio unit. Example operation 808 represents associating, by the network equipment based on the second location data, the second user equipment with the second radio unit. The operations continue at FIG. 9, in which example operation 902 represents selecting, by the network equipment from a larger group of resource blocks to be transmitted in a timeframe via radio units of the distributed antenna system, a first subgroup of resource blocks of the group of resource blocks to be transmitted to the first user equipment, wherein the first subgroup can include fewer resource blocks than the larger group of resource blocks. Example operation 904 represents selecting, by the network equipment from the larger group of resource blocks to be transmitted in the timeframe via radio units of the distributed antenna system, a second subgroup of resource blocks of the larger group of resource blocks to be transmitted to the second user equipment, wherein the second subgroup can include fewer resource blocks than the larger group of resource blocks. Example operation 906 represents facilitating, by the network equipment, transmitting the first subgroup of resource blocks to the first user equipment via the first radio unit. Example operation 908 represents facilitating, by the network equipment, transmitting the second subgroup of resource blocks to the second user equipment via the second radio unit.

Determining the first location data can include decoding physical random-access channel signal data from the radio at initial attach time of the user equipment.

Determining the first location data can include at least one of: decoding periodic physical random-access channel data, evaluating physical uplink control channel decoding result data, evaluating sounding reference signal report data, evaluating channel-state information-reference signal report, evaluating physical uplink shared channel cyclic redundancy check status data, or initiating an aperiodic sounding reference signal to determine channel condition data from at least one other radio unit.

The larger group of resource blocks can be a first larger group, wherein the timeframe can be a first timeframe, and further operations can include determining, by the network equipment, third location data of the first user equipment corresponding to the second radio unit of the distributed antenna system, associating, by the network equipment, the first user equipment with the second radio unit based on the third location data, selecting, by the network equipment from a second larger group of resource blocks to be transmitted in a second timeframe via the radio units of the distributed antenna system, a third subgroup of resource blocks of the second larger group of resource blocks to be transmitted to the first user equipment and to be transmitted to the second user equipment, wherein the third subgroup can include fewer resource blocks than the second group of resource blocks, and facilitating, by the network equipment, transmitting the third subgroup of resource blocks to the first user equipment and to the second user equipment via the second radio unit.

The larger group of resource blocks can be a first larger group, wherein the timeframe can be a first timeframe, and further operations can include determining, by the network equipment, third location data of the first user equipment corresponding to a third radio unit of the distributed antenna system, wherein the third radio unit is different from the first radio unit and the second radio unit, associating, by the network equipment, the first user equipment with the third radio unit based on the third location data, selecting, by the network equipment from a second larger group of resource blocks to be transmitted in a second timeframe via the radio units of the distributed antenna system, a third subgroup of resource blocks of the second larger group of resource blocks to be transmitted to the first user equipment, wherein the third subgroup can include fewer resource blocks than the second larger group of resource blocks, selecting, by the network equipment from the second larger group of resource blocks to be transmitted in the second timeframe via the radio units of the distributed antenna system, a fourth subgroup of resource blocks of the second larger group of resource blocks to be transmitted to the second user equipment, wherein the fourth subgroup can include fewer resource blocks than the second larger group of resource blocks, facilitating, by the network equipment, transmitting the third subgroup of resource blocks to the first user equipment via the third radio unit, and facilitating, by the network equipment, transmitting the fourth subgroup of resource blocks to the second user equipment via the second radio unit.

Figure 10:
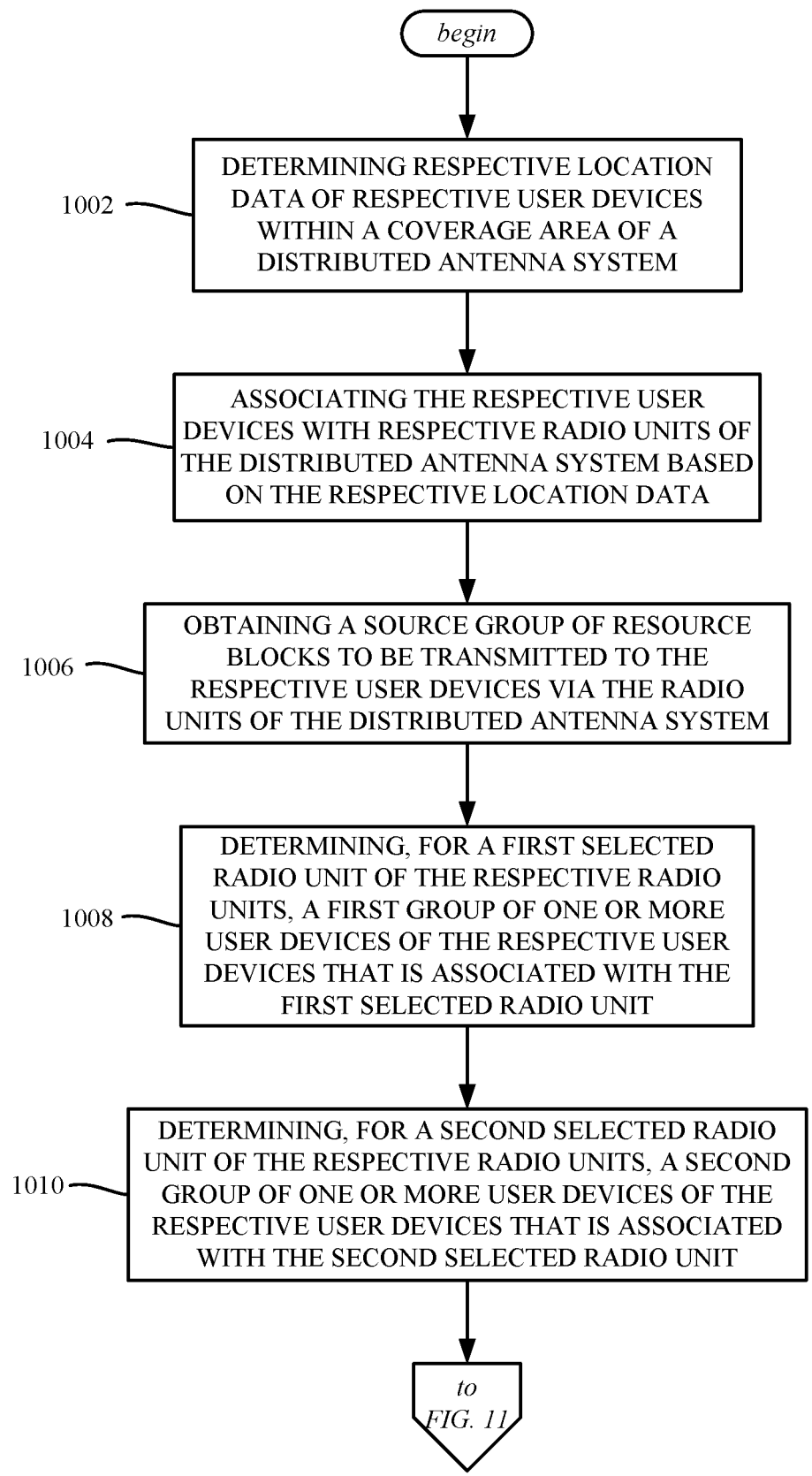
FIGS. 10 and 11 comprise a flow diagram showing example operations related to obtaining and sending subgroups of resource blocks to radio units for transmission to selected user equipment, in accordance with various aspects and implementations of the subject disclosure.
Figure 11:
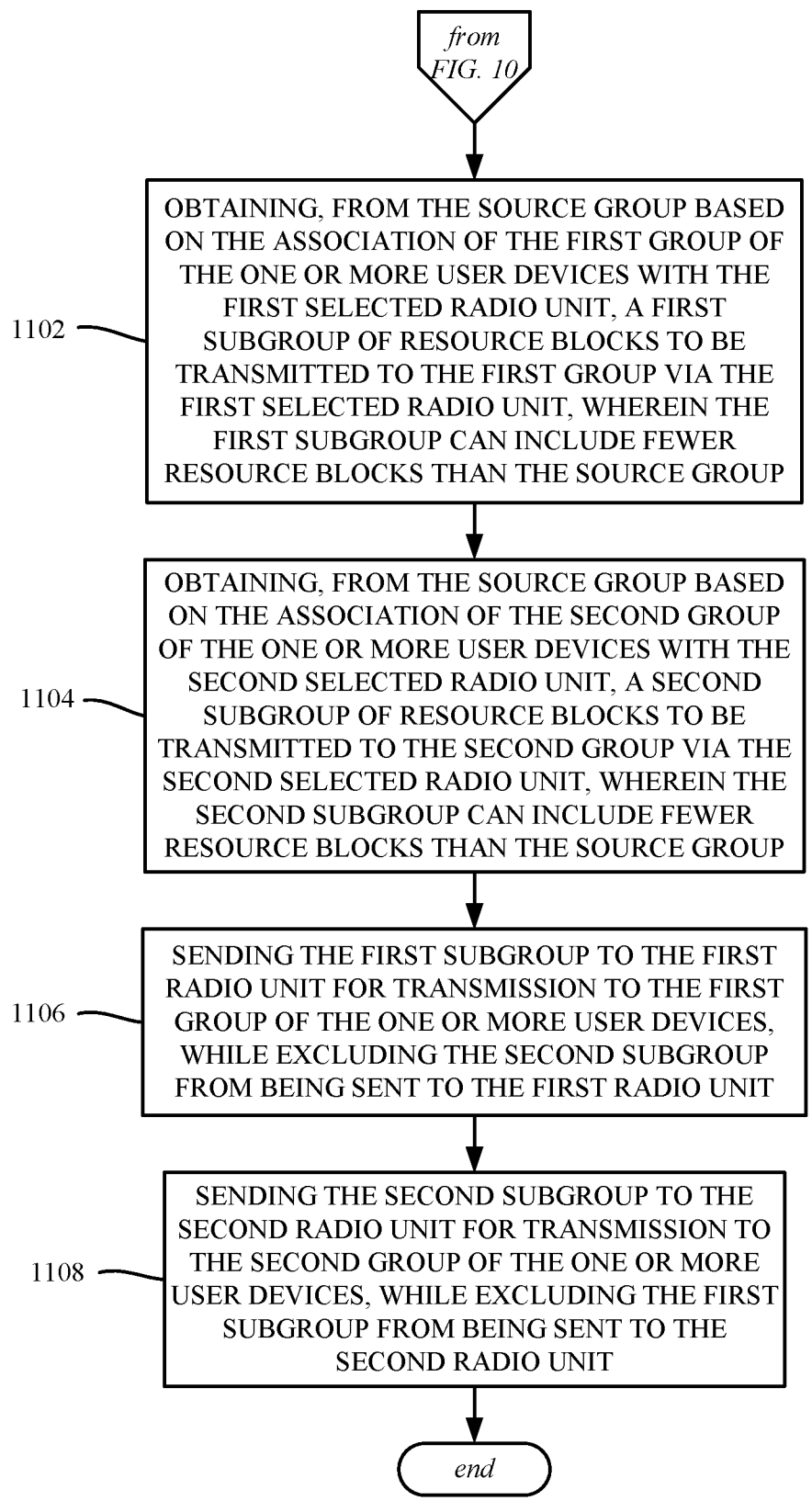

FIGS. 10 and 11 summarize various example operations, e.g., corresponding to a machine-readable medium, comprising executable instructions that, when executed by a processor, facilitate performance of operations. Example operation 1002 of FIG. 10 represents determining respective location data of respective user devices within a coverage area of a distributed antenna system. Example operation 1004 represents associating the respective user devices with respective radio units of the distributed antenna system based on the respective location data. Example operation 1006 represents obtaining a source group of resource blocks to be transmitted to the respective user devices via the radio units of the distributed antenna system. Example operation 1008 represents determining, for a first selected radio unit of the respective radio units, a first group of one or more user devices of the respective user devices that is associated with the first selected radio unit. Example operation 1010 represents determining, for a second selected radio unit of the respective radio units, a second group of one or more user devices of the respective user devices that is associated with the second selected radio unit. Example operation 1102 represents obtaining, from the source group based on the association of the first group of the one or more user devices with the first selected radio unit, a first subgroup of resource blocks to be transmitted to the first group via the first selected radio unit, wherein the first subgroup can include fewer resource blocks than the source group. The operations continue at FIG. 11, in which example operation 1104 represents obtaining, from the source group based on the association of the second group of the one or more user devices with the second selected radio unit, a second subgroup of resource blocks to be transmitted to the second group via the second selected radio unit, wherein the second subgroup can include fewer resource blocks than the source group. Example operation 1106 represents sending the first subgroup to the first radio unit for transmission to the first group of the one or more user devices, while excluding the second subgroup from being sent to the first radio unit. Example operation 1108 represents sending the second subgroup to the second radio unit for transmission to the second group of the one or more user devices, while excluding the first subgroup from being sent to the second radio unit.

Obtaining the first subgroup of resource blocks to be transmitted to the first group can include masking resource blocks of the source group based on which user devices are not associated with the first radio unit.

The respective location data can be first respective location data, and further operations can include updating, after the sending of the first subgroup and the sending of the second subgroup, the first respective location data to second respective location data.

Determining the respective location data of the respective user devices can include at least one of: decoding physical random-access channel signal data from the radio at initial attach time of the user device, decoding periodic physical random-access channel data, evaluating physical uplink control channel decoding result data, evaluating sounding reference signal report data, evaluating channel-state information-reference signal report, evaluating physical uplink shared channel cyclic redundancy check status data, or initiating an aperiodic sounding reference signal to determine channel condition data from at least one other radio unit.

As can be seen, the technology described herein facilitates more efficient operation of radio units and user equipment in a distributed antenna system. This saves bandwidth and processing, and reduces each radio unit's power consumption as well as overall distributed antenna system power consumption.

Figure 12:
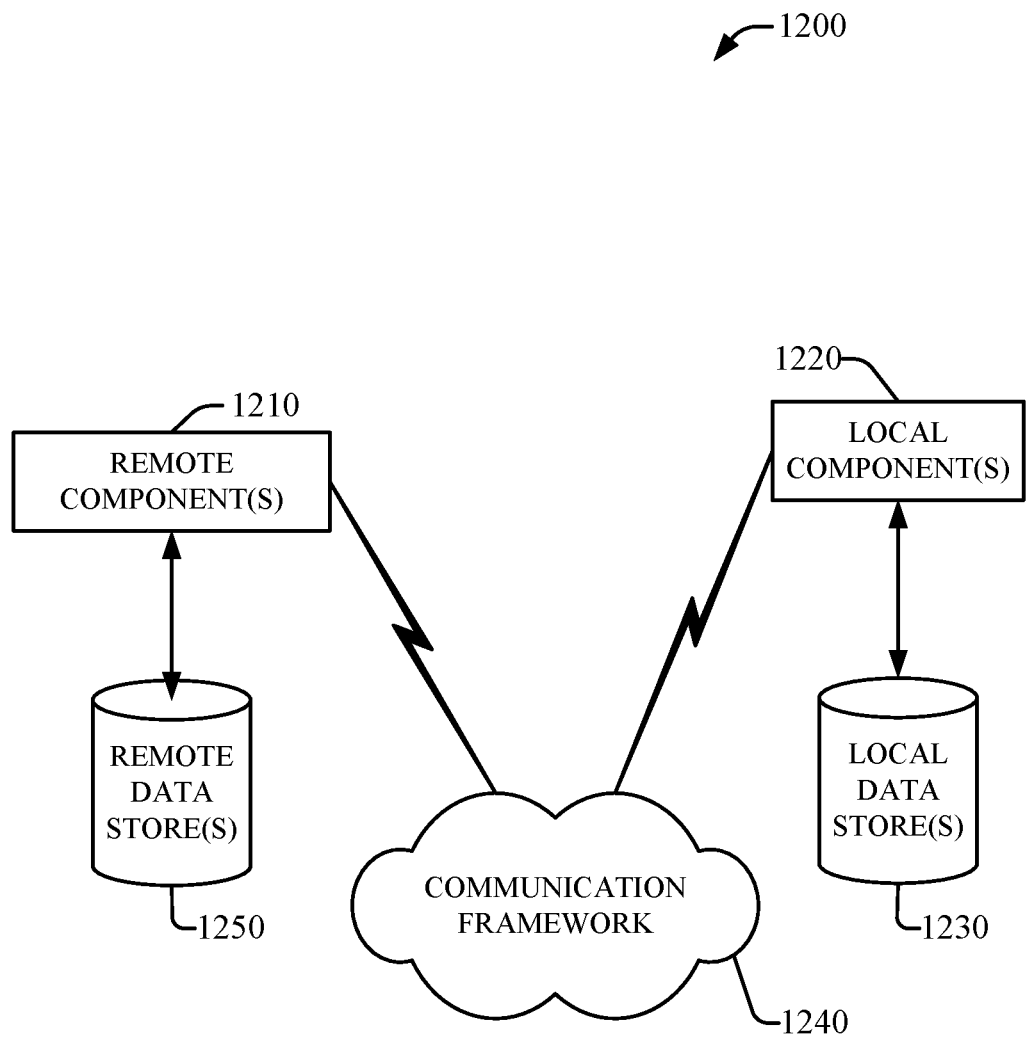
FIG. 12 is a block diagram representing an example computing environment into which aspects of the subject matter described herein may be incorporated.

FIG. 12 is a schematic block diagram of a computing environment 1200 with which the disclosed subject matter can interact. The system 1200 comprises one or more remote component(s) 1210. The remote component(s) 1210 can be hardware and/or software (e.g., threads, processes, computing devices). In some embodiments, remote component(s) 1210 can be a distributed computer system, connected to a local automatic scaling component and/or programs that use the resources of a distributed computer system, via communication framework 1240. Communication framework 1240 can comprise wired network devices, wireless network devices, mobile devices, wearable devices, radio access network devices, gateway devices, femtocell devices, servers, etc.

The system 1200 also comprises one or more local component(s) 1220. The local component(s) 1220 can be hardware and/or software (e.g., threads, processes, computing devices). In some embodiments, local component(s) 1220 can comprise an automatic scaling component and/or programs that communicate/use the remote resources 1210, etc., connected to a remotely located distributed computing system via communication framework 1240.

One possible communication between a remote component(s) 1210 and a local component(s) 1220 can be in the form of a data packet adapted to be transmitted between two or more computer processes. Another possible communication between a remote component(s) 1210 and a local component(s) 1220 can be in the form of circuit-switched data adapted to be transmitted between two or more computer processes in radio time slots. The system 1200 comprises a communication framework 1240 that can be employed to facilitate communications between the remote component(s) 1210 and the local component(s) 1220, and can comprise an air interface, e.g., Uu interface of a UMTS network, via a long-term evolution (LTE) network, etc. Remote component(s) 1210 can be operably connected to one or more remote data store(s) 1250, such as a hard drive, solid state drive, SIM card, device memory, etc., that can be employed to store information on the remote component(s) 1210 side of communication framework 1240. Similarly, local component(s) 1220 can be operably connected to one or more local data store(s) 1230, that can be employed to store information on the local component(s) 1220 side of communication framework 1240.

Figure 13:
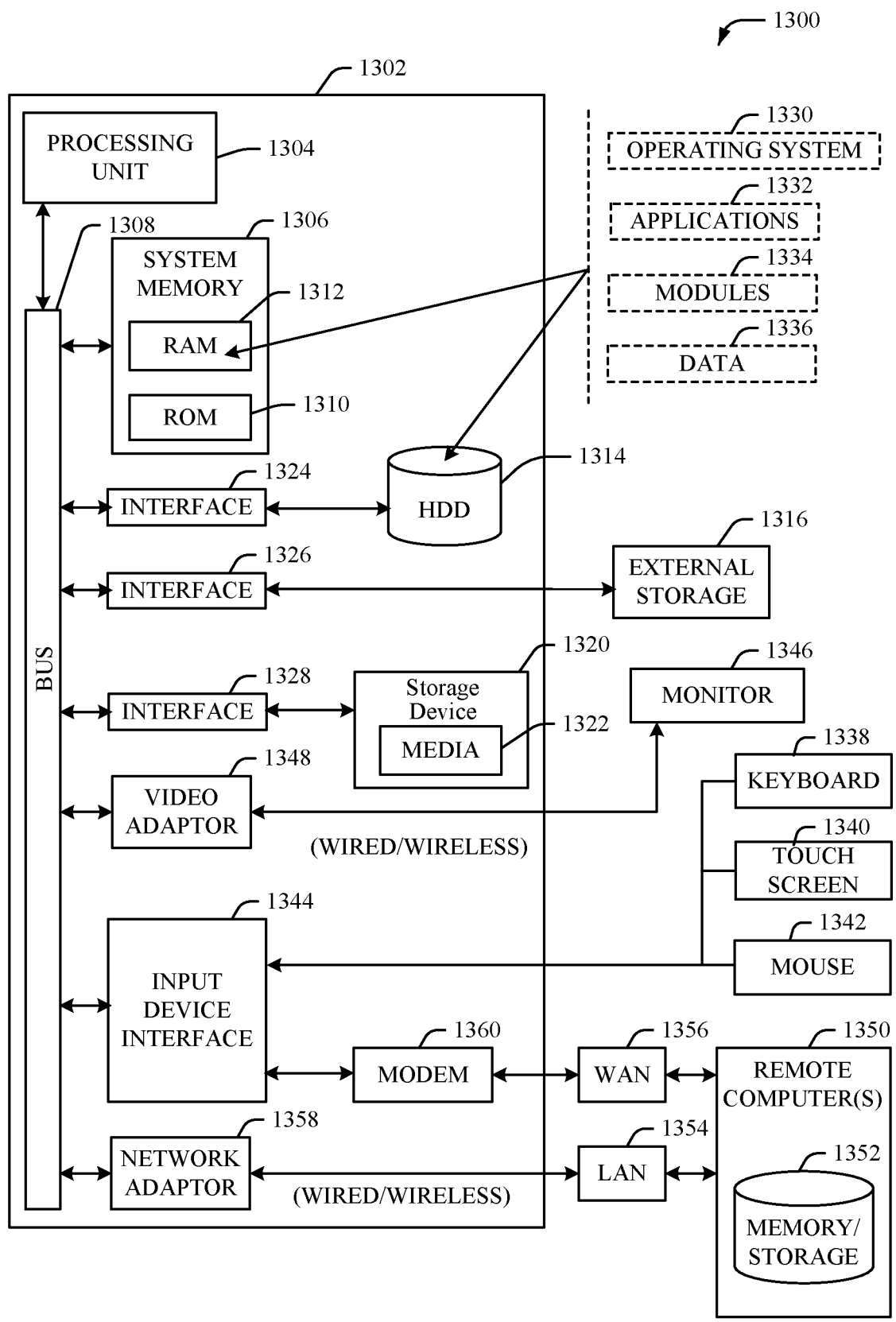
FIG. 13 depicts an example schematic block diagram of a computing environment with which the disclosed subject matter can interact/be implemented at least in part, in accordance with various aspects and implementations of the subject disclosure.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), and can include one or more external storage devices 1316 (e.g., a magnetic floppy disk drive (FDD) 1316, a memory stick or flash drive reader, a memory card reader, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314.

Other internal or external storage can include at least one other storage device 1320 with storage media 1322 (e.g., a solid state storage device, a nonvolatile memory device, and/or an optical disk drive that can read or write from removable media such as a CD-ROM disc, a DVD, a BD, etc.). The external storage 1316 can be facilitated by a network virtual machine. The HDD 1314, external storage device(s) 1316 and storage device (e.g., drive) 1320 can be connected to the system bus 1308 by an HDD interface 1324, an external storage interface 1326 and a drive interface 1328, respectively.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are examples and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. Network equipment, comprising:
   at least one processor; and
   at least one memory that stores executable instructions that, when executed by the at least one processor, facilitate performance of operations, the operations comprising:
   obtaining radio unit identification data indicative of a radio unit of a distributed antenna system that is serving selected user equipment;
   determining, based on the radio unit identification data, a subgroup of resource blocks to be transmitted to the selected user equipment, wherein the subgroup of resource blocks has fewer resource blocks relative to a larger group of resource blocks to be transmitted in a timeframe via the distributed antenna system, and wherein the subgroup of resource blocks is determined by masking other resource blocks of the larger group of resource blocks; and
   sending the subgroup of resource blocks to the radio unit for transmission to the selected user equipment while excluding the other resource blocks of the larger group from being sent to the radio unit.

2. The network equipment of claim 1, wherein the operations further comprise maintaining the radio unit identification data as part of a radio network temporary identifier value associated with the selected user equipment.

3. The network equipment of claim 1, wherein the selected user equipment comprises at least two different user equipment.

4. The network equipment of claim 1, wherein the obtaining of the radio unit identification data comprises tracking location data of a user equipment of the selected user equipment, determining the radio unit identification data based on the location data, and wherein the operations further comprise associating the user equipment with the radio unit identification data.

5. The network equipment of claim 4, wherein the tracking of the location data comprises decoding physical random-access channel signal data from the radio at initial attach time of the user equipment.

6. The network equipment of claim 4, wherein the radio unit is a first radio unit, wherein the radio unit identification data is first radio unit identification data, wherein the location data is first location data, wherein the tracking of the location data comprises determining that the user equipment has moved to a different location having second location data, and wherein the operations further comprise:
   determining second radio unit identification data based on the second location data; and
   associating the user equipment with the second radio unit identification data for a subsequent transmission of resource blocks to the user equipment.

7. The network equipment of claim 6, wherein the tracking of the location data comprises at least one of: decoding periodic physical random-access channel data, evaluating physical uplink control channel decoding result data, evaluating sounding reference signal report data, evaluating channel-state information-reference signal report, evaluating physical uplink shared channel cyclic redundancy check status data, or initiating a sounding reference signal to determine channel condition data corresponding to the user equipment from at least one other radio unit other than the radio unit.

8. The network equipment of claim 6, wherein the timeframe is a first timeframe, wherein the subgroup is a first subgroup of a first larger group, and wherein the operations further comprise:
   determining, based on the second radio unit identification data, a second subgroup of resource blocks to be transmitted to the user equipment, wherein the second subgroup has fewer resource blocks relative to a second larger group of resource blocks to be transmitted in a second timeframe via the distributed antenna system; and
   sending the second subgroup of resource blocks to the second radio unit for transmission to the user equipment without sending other resource blocks of the larger group to the second radio unit.

9. The network equipment of claim 6, wherein the timeframe is a first timeframe, wherein the subgroup is a first subgroup of a first larger group, wherein the user equipment is a first user equipment, and wherein the operations further comprise:
   determining, based on the second radio unit identification data, a second subgroup of resource blocks to be transmitted to the first user equipment and transmitted to a second user equipment of the selected user equipment that is associated with the second radio unit identification data, wherein the second subgroup of resource blocks has fewer resource blocks relative to a second larger group of resource blocks to be transmitted in a second timeframe via the distributed antenna system; and
   sending the second subgroup of resource blocks second radio unit for transmission to the first user equipment and to the second user equipment without sending other resource blocks of the larger group to the second radio unit.

10. The network equipment of claim 1, wherein the network equipment comprises a distributed unit coupled to the radio unit of the distributed antenna system and coupled to at least one other radio unit of the distributed antenna system other than the radio unit.

11. A method, comprising:
   determining, by a network equipment comprising at least one processor, first location data of a first user equipment corresponding to a first radio unit of a distributed antenna system to which the first user equipment is communicatively coupled;
   associating, by the network equipment based on the first location data, the first user equipment with the first radio unit;
   determining, by the network equipment, second location data of a second user equipment corresponding to a second radio unit of the distributed antenna system to which the second user equipment is communicatively coupled, wherein the second radio unit is different from the first radio unit;

associating, by the network equipment based on the second location data, the second user equipment with the second radio unit;

selecting, by the network equipment from a larger group of resource blocks to be transmitted in a timeframe via radio units of the distributed antenna system, a first subgroup of resource blocks of the group of resource blocks to be transmitted to the first user equipment, wherein the first subgroup comprises fewer resource blocks than the larger group of resource blocks;

selecting, by the network equipment from the larger group of resource blocks to be transmitted in the timeframe via radio units of the distributed antenna system, a second subgroup of resource blocks of the larger group of resource blocks to be transmitted to the second user equipment, wherein the second subgroup comprises fewer resource blocks than the larger group of resource blocks;

facilitating, by the network equipment, transmitting the first subgroup of resource blocks to the first user equipment via the first radio unit; and facilitating, by the network equipment, transmitting the second subgroup of resource blocks to the second user equipment via the second radio unit.

12. The method of claim 11, wherein the determining of the first location data comprises decoding physical random-access channel signal data from the radio at initial attach time of the user equipment.

13. The method of claim 11, wherein the determining of the first location data comprises at least one of: decoding periodic physical random-access channel data, evaluating physical uplink control channel decoding result data, evaluating sounding reference signal report data, evaluating channel-state information-reference signal report, evaluating physical uplink shared channel cyclic redundancy check status data, or initiating an aperiodic sounding reference signal to determine channel condition data from at least one other radio unit.

14. The method of claim 11, wherein the larger group of resource blocks is a first larger group, wherein the timeframe is a first timeframe, and further comprising:

determining, by the network equipment, third location data of the first user equipment corresponding to the second radio unit of the distributed antenna system;

associating, by the network equipment, the first user equipment with the second radio unit based on the third location data;

selecting, by the network equipment from a second larger group of resource blocks to be transmitted in a second timeframe via the radio units of the distributed antenna system, a third subgroup of resource blocks of the second larger group of resource blocks to be transmitted to the first user equipment and to be transmitted to the second user equipment, wherein the third subgroup comprises fewer resource blocks than the second group of resource blocks; and facilitating, by the network equipment, transmitting the third subgroup of resource blocks to the first user equipment and to the second user equipment via the second radio unit.

15. The method of claim 11, wherein the larger group of resource blocks is a first larger group, wherein the timeframe is a first timeframe, and further comprising:

determining, by the network equipment, third location data of the first user equipment corresponding to a third radio unit of the distributed antenna system, wherein the third radio unit is different from the first radio unit and the second radio unit;

associating, by the network equipment, the first user equipment with the third radio unit based on the third location data;

selecting, by the network equipment from a second larger group of resource blocks to be transmitted in a second timeframe via the radio units of the distributed antenna system, a third subgroup of resource blocks of the second larger group of resource blocks to be transmitted to the first user equipment, wherein the third subgroup comprises fewer resource blocks than the second larger group of resource blocks;

selecting, by the network equipment from the second larger group of resource blocks to be transmitted in the second timeframe via the radio units of the distributed antenna system, a fourth subgroup of resource blocks of the second larger group of resource blocks to be transmitted to the second user equipment, wherein the fourth subgroup comprises fewer resource blocks than the second larger group of resource blocks;

facilitating, by the network equipment, transmitting the third subgroup of resource blocks to the first user equipment via the third radio unit; and facilitating, by the network equipment, transmitting the fourth subgroup of resource blocks to the second user equipment via the second radio unit.

16. A non-transitory machine-readable medium, comprising executable instructions that, when executed by at least one processor, facilitate performance of operations, the operations comprising:

determining respective location data of respective user devices within a coverage area of a distributed antenna system;

associating the respective user devices with respective radio units of the distributed antenna system based on the respective location data;

obtaining a source group of resource blocks to be transmitted to the respective user devices via the radio units of the distributed antenna system;

determining, for a first selected radio unit of the respective radio units, a first group of one or more user devices of the respective user devices that is associated with the first selected radio unit;

determining, for a second selected radio unit of the respective radio units, a second group of one or more user devices of the respective user devices that is associated with the second selected radio unit;

obtaining, from the source group based on the association of the first group of the one or more user devices with the first selected radio unit, a first subgroup of resource blocks to be transmitted to the first group via the first selected radio unit, wherein the first subgroup comprises fewer resource blocks than the source group;

obtaining, from the source group based on the association of the second group of the one or more user devices with the second selected radio unit, a second subgroup of resource blocks to be transmitted to the second group via the second selected radio unit, wherein the second subgroup comprises fewer resource blocks than the source group;

sending the first subgroup to the first radio unit for transmission to the first group of the one or more user devices, while excluding the second subgroup from being sent to the first radio unit; and sending the second subgroup to the second radio unit for transmission to the second group of the one or more user devices, while excluding the first subgroup from being sent to the second radio unit.

17. The non-transitory machine-readable medium of claim 16, wherein the obtaining of the first subgroup of resource blocks to be transmitted to the first group comprises masking resource blocks of the source group based on which user devices are not associated with the first radio unit.

18. The non-transitory machine-readable medium of claim 16, wherein the respective location data is first respective location data, and wherein the operations further comprise updating, after the sending of the first subgroup and the sending of the second subgroup, the first respective location data to second respective location data.

19. The non-transitory machine-readable medium of claim 16, wherein the determining of the respective location data of the respective user devices comprises at least one of: decoding physical random-access channel signal data from the radio at initial attach time of the user device, decoding periodic physical random-access channel data, evaluating physical uplink control channel decoding result data, evaluating sounding reference signal report data, evaluating channel-state information-reference signal report, evaluating physical uplink shared channel cyclic redundancy check status data, or initiating an aperiodic sounding reference signal to determine channel condition data from at least one other radio unit.

20. The non-transitory machine-readable medium of claim 16, wherein the operations further comprise maintaining the radio unit identification data as part of a radio network temporary identifier value associated with the selected user equipment.

* * * * *